Aug. 26, 1958  A. A. DE KONING ET AL  2,849,090
SHOCK ABSORBER RESERVOIR VALVE
Filed July 29, 1955  2 Sheets-Sheet 1

INVENTOR.
ARIE A. DE KONING &
KORNELIS K.K. DE KONING
BY Wenderoth, Lind & Ponack
Attys.

Aug. 26, 1958  A. A. DE KONING ET AL  2,849,090
SHOCK ABSORBER RESERVOIR VALVE
Filed July 29, 1955  2 Sheets-Sheet 2
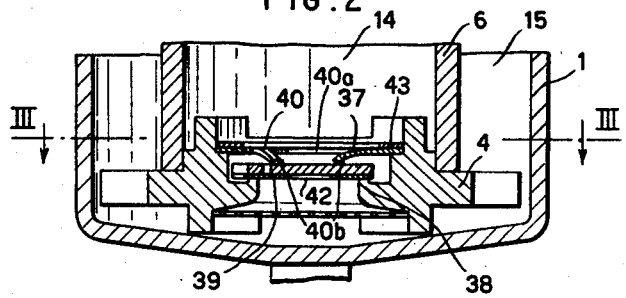
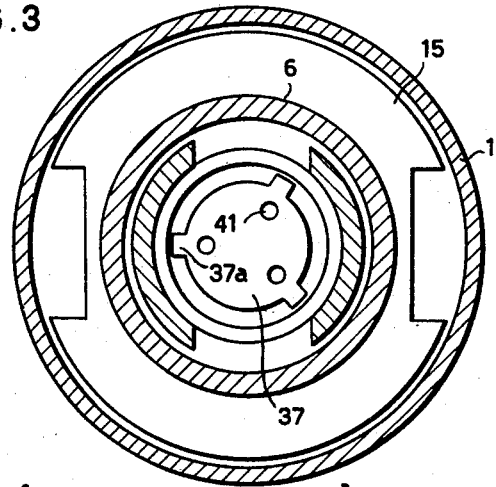
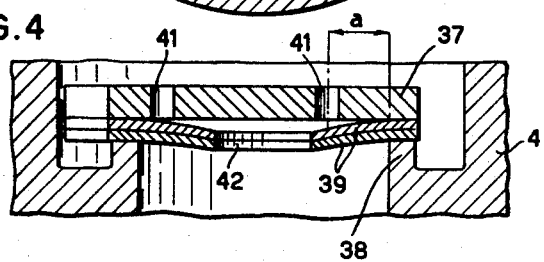
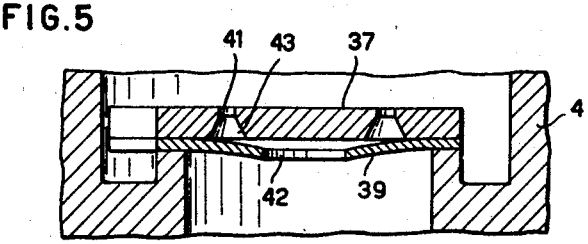
INVENTOR.
ARIE A. DE KONING &
KORNELIS K. K. DE KONING
BY Wenderoth, Lind & Ponack
Attys.

United States Patent Office 2,849,090
Patented Aug. 26, 1958

2,849,090

SHOCK ABSORBER RESERVOIR VALVE

Arie A. De Koning and Kornelis K. K. De Koning, Oud-Beijerland, Netherlands

Application July 29, 1955, Serial No. 525,322

Claims priority, application Netherlands May 18, 1953

2 Claims. (Cl. 188—100)

This invention relates to a shock absorber of the type comprising a cylinder, a piston connected to a piston rod and mounted for reciprocal movement in said cylinder, said piston dividing the space within the cylinder into two chambers and being provided with a passage connecting said chambers, and a reservoir connected to said cylinder through a relief valve.

This application is a continuation-in-part of application Ser. No. 430,314 filed May 17, 1954.

It is an object of this invention to provide a shock absorber having a relief valve of novel construction.

In the construction of the shock absorber according to the present invention the reservoir is provided in the form of an outer cylinder within which is positioned a working cylinder which is spaced from the walls of said outer cylinder. The novel relief valve is provided in one end of the working cylinder and permits passage of fluid from the working cylinder to and from the reservoir formed by the spaced working and outer cylinders.

It is a further object of the present invention to provide a relief valve of very light and simple construction, which if desired can offer a high resistance against fluid passing the valve, without risk of overloading the valve and rupture of parts thereof.

Other and further objects of the invention will become apparent from the following description and the appended claims taken together with the accompanying drawings, in which:

Fig. 2 is an enlarged view of a portion of Fig. 1 showing a longitudinal section of a relief valve according to the invention and having a thin resilient plate;

Fig. 3 is a cross section along line III—III of Fig. 2 with parts 40 and 43 removed for clarity; and Fig. 4 is an enlarged partial sectional view of a second embodiment of the relief valve according to the invention during its operation; and Fig. 5 is an enlarged partial sectional view of a third embodiment of a relief valve according to the invention during its operation.

Figure 1:
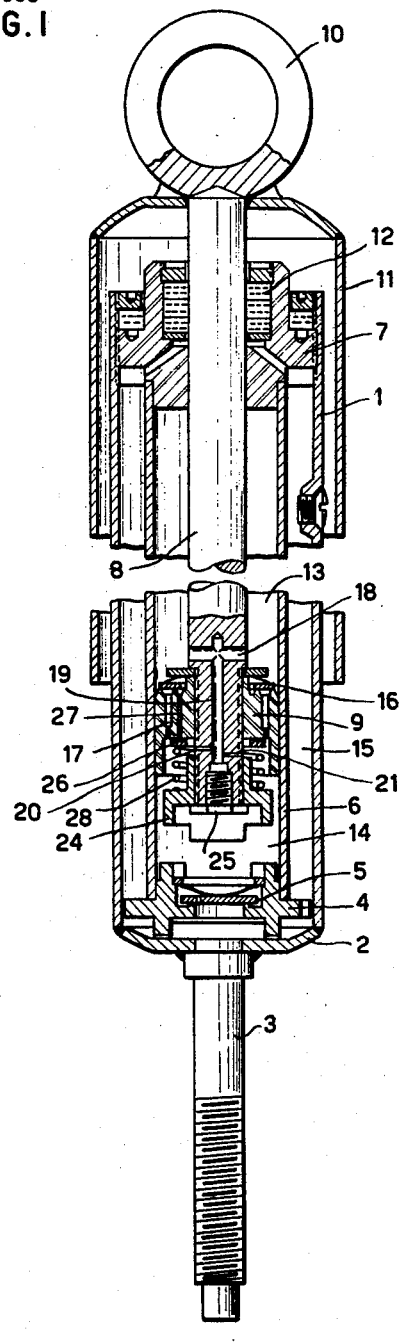
Fig. 1 is a longitudinal section of a shock absorber according to the invention.

The shock absorber according to Fig. 1 is provided with an outer cylinder 1 comprising a bottom 2 to which is connected an eye or a connecting rod 3 for connection of the shock absorber to part of a motor vehicle or the like. A housing 4 for a relief valve 5 is mounted near said bottom 2 and connected to a working cylinder 6 and a cover 7 for the outer cylinder 1. Said cover 7 is shaped as a nut. A piston rod 8 passes through said nut. One end of said rod 8 is connected to a piston 9 which is provided with a valve and passageways. The other end of the piston rod 8 is connected to a sleeve 11. To said sleeve an eye 10 is secured, e. g. by welding. The cover 7 is provided with a suitable seal against oil leakage.

The interior of the cylinder 6 is divided by the piston 9 into two chambers 13 and 14. The annular space 15 between the cylinders 1 and 6 constitutes a reservoir for absorber fluid such as mineral oil. The chambers 13 and 14 are completely filled with this fluid, whereas the annular space 15 is only partially filled therewith.

During the inward stroke of the piston 9, i. e. a downward stroke of the piston as shown in the drawings, the chamber 13 should be filled with oil and remain filled. This is achieved by means of a valve in the piston, which is described hereinafter. Oil under pressure in chamber 14 during the inward stroke can escape from chamber 14 through the relief valve 5 into the annular space 15.

The relief valve 5 comprises a rigid plate 37, which at its periphery is guided by lugs 37a in the housing 4. Between the plate 37 and a seat 38 on the housing 4 are mounted one or more thin resilient plates 39 having apertures 42 near the centers thereof. The plate 37 together with the thin plates 39 are urged onto the seat 38 by a spring 40 which consists of a ring 40a with inwardly extending and downwardly bent extensions 40b which are circumferentially spaced around the ring 40a. Spring 40 is held in place by ring 43 pressed into place in housing 4.

The strength of the spring 40 is such that during flow of fluid in the upward direction, i. e. during an outward stroke of the piston, the plates 39 and 37 are raised against the action of the spring 40 when the pressure in the chamber 14 falls below a certain point, as will be later described.

In the plate 37 are provided a plurality of fine bores 41. These bores end near the unapertured parts of resilient plates 39. Said plates 39 and the rigid plate 37 are flat and in unloaded position of the relief valve, as shown in Figure 2 the plates 39 and the plate 37 are urged with their flat sides onto each other. During flow of fluid from chamber 14 through the relief valve in the direction of the space 15, the fluid pressure acts through the bores 41 in plate 37 on the resilient plates 39. The plates 39 are only loaded very locally namely at the spots where the bores 41 merge onto them. The flow is first throttled by the bores 41 and is further restricted by the resiliency of plates 39.

Figs. 4 and 5 illustrates how the resilient plates 39 will deform during fluid flow from chamber 14 to chamber 15. Resilient plates 39 are not biased against plate 37, and since both plates are flat, a slight pressure is sufficient to bend the resilient plates 39 and cause a flow between plates 39 and 37 and through the aperture 42 in the center of plates 39.

Thus, the resistance to fluid flow through the relief valve is determined by the size of the bores 41 and the resistance offered by the resilient plates 39. The resistance offered by the plates 39 is affected by the resilience of the plates and the dimension of the plates between the periphery of the bore 42 and the edge of the plate on the seat 38.

In the embodiment shown in Fig. 5, the bores 41 flare downwardly and outwardly at 43. By means of the flared section, the effect of the fluid on the resilient plates 39 may be made somewhat greater, while the actual size of the bores 41 can be kept quite small and thus cause considerable flow resistance.

If it is desired, small recesses may be provided in the seat 38 or a small hole may be bored in plate 37 opposite the aperture 42 so that fluid can escape without the risk of permanently deforming the resilient plates 39. In both of the species of Figs. 4 and 5, plate 37 is held in place in the same manner as in the species of Fig. 2. The parts 40 and 43 and part of housing 4 have been omitted for greater clarity.

The piston 9 is provided with a plurality of longitudinal bores 17 which are closed by a spring loaded annular valve 16 on the end of the piston adjacent chamber 13. Piston rod 8 is provided with an axial bore 19 to which access is gained through access ports in the form of radial bores 18 which lead from chamber 13 into bore 19. Flow restricting passageways in the form of fine bores 20 and 21 lead from the axial bore 19 into chamber 14. The bores 20 and 21 are offset along the axial length of piston rod 8. The end of piston rod 8 which extends into the chamber 14 is threaded, and on this threaded end is positioned a member 24 for adjusting the flow area through bores 20 and 21. The adjusting member 24 is locked by screw 25. Piston 9 is also provided with longitudinal bores 27, which open into chamber 13, and an annular valve 26 is positioned over the ends of bores 27 at the end of the piston facing chamber 14. Between the adjusting member 24 and the annular valve 26 is a spring 28.

During the outward stroke of the piston 9, i. e. upward in the drawings, pressure is exerted on the fluid in chamber 13. Annular valve 16 then closes longitudinal bores 17 in the piston 9. Fluid from chamber 13 can escape through access ports 18 in the piston rod 8 and through the axial bore 19. The fluid then passes through the flow restricting passages 20 and 21 which may be more or less throttled or even closed by adjusting member 24 into the chamber 14. If the pressure in chamber 13 becomes great enough to overcome the force of spring 28, the annular valve 26 will be lifted and the bores 27 uncovered. Fluid will then by-pass the passages 18, 19, 20, 21 until the pressure in chamber 13 drops.

When using the relief valve with such a piston arrangement as shown in Fig. 1, it is possible to obtain a damping effect during the inward stroke which is substantially linearly dependent on the speed of the piston. The size of the longitudinal bores 17, the size of the bores 41 and the dimensions and resiliency of the annular plates 39 are so chosen that the damping effect of the shock absorber is linearly related to the speed of the piston.

Similarly it is possible to obtain a damping effect during the outward stroke which is likewise linearly dependent on the speed of the piston. If the flow of fluid between chambers 13 and 14 through bores 27 and passages 20, 21 is not sufficient to maintain the linear relationship between the damping effect and the speed of the piston, the relief valve can open and admit fluid to chamber 14 from the space 15. The spring 40 is of a strength such that it will allow the relief valve 5 to open when the pressure in chamber 14 falls below a predetermined value and the described linear relationship is not being effected.

Having thus disclosed the invention, what is claimed is:

1. In a shock absorber having a working cylinder surrounded by an outer cylinder spaced from said working cylinder to leave an annular reservoir therebetween, a relief valve in one end of the working cylinder between the interior of the working cylinder and the reservoir comprising an annular valve seat defining an inner passage of circular cross section, at least one thin resilient plate and one rigid plate each having an outer diameter which is at least equal to that of said seat, said plates being stacked on said seat to close said passage with said thin resilient plate between said rigid plate and said seat, said thin resilient plate having an aperture therein and located on the axis of said inner passage, and said rigid plate having at least one fine bore therein spaced inwardly from said seat and outwardly from said aperture, the face of said thin resilient plate toward said rigid plate and the face of said rigid plate toward said thin resilient plate contacting each other at least along the portion of the surface of said rigid plate into which said fine bore opens, whereby the bore is sealed off individually.

2. In a shock absorber having a working cylinder surrounded by an outer cylinder spaced from said working cylinder to leave an annular reservoir therebetween, a relief valve in one end of the working cylinder between the interior of the working cylinder and the reservoir comprising an annular valve seat defining an inner passage of circular cross section, a plurality of thin resilient plates and one rigid plate each having an outer diameter which is at least equal to that of said seat, said plates being stacked on said seat to close said passage with said thin resilient plates between said rigid plate and said seat, said thin resilient plates having an aperture therein and located on the axis of said inner passage, and said rigid plate having a plurality of fine bores therein spaced inwardly from said seat and outwardly from said aperture, the face of said thin resilient plate adjacent said rigid plate which is toward said rigid plate and the face of said rigid plate toward said adjacent thin resilient plate contacting each other at least along the portion of the surface of said rigid plate into which said fine bores open, whereby said bores are sealed off individually.

References Cited in the file of this patent

UNITED STATES PATENTS

| 280,212 | Miles | June 26, 1883 |
| 2,111,192 | Padgett | Mar. 15, 1938 |
| 2,320,697 | Binder | June 1, 1943 |
| 2,481,088 | Cuskie | Sept. 6, 1949 |

FOREIGN PATENTS

| 900,061 | Germany | Dec. 17, 1953 |
| 739,459 | Great Britain | Oct. 26, 1955 |
| 147,828 | Sweden | Nov. 23, 1954 |